Sept. 19, 1950 E. W. ERICSON 2,523,202
DISPLAY BINDER
Filed Nov. 19, 1947 2 Sheets-Sheet 1
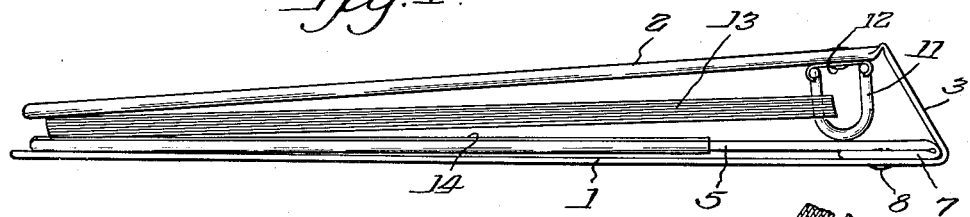
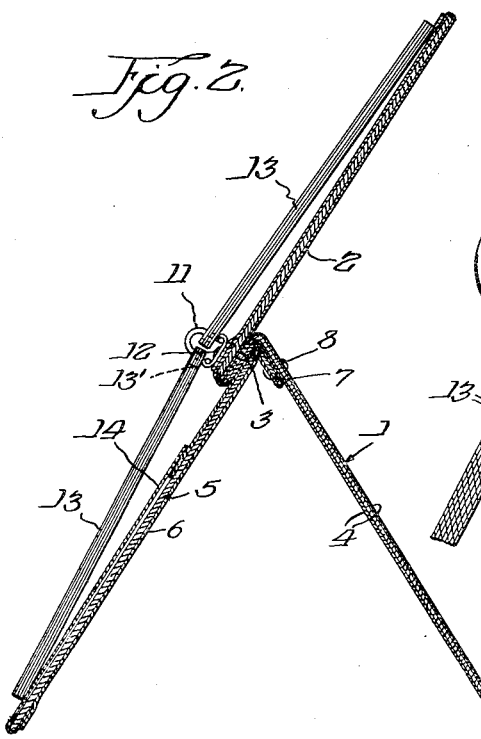
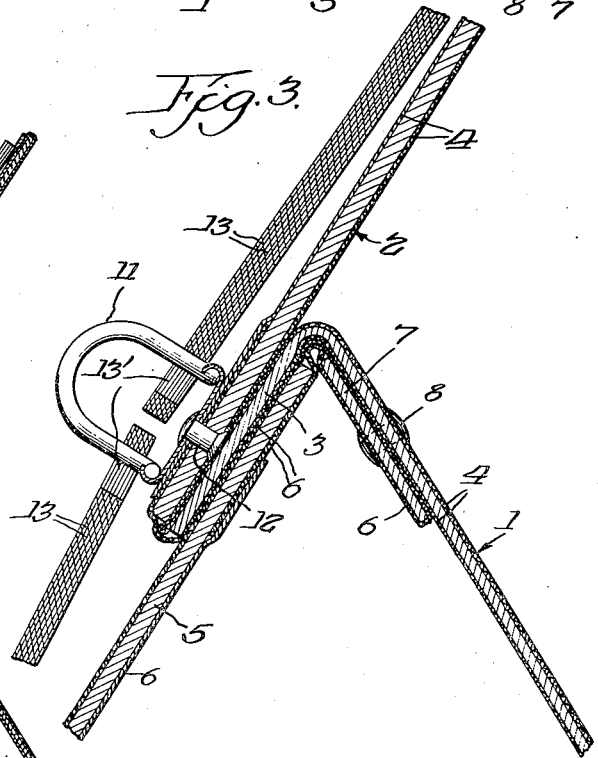
Inventor:
Elmer W. Ericson
By W. F. Kellogg
Atty.

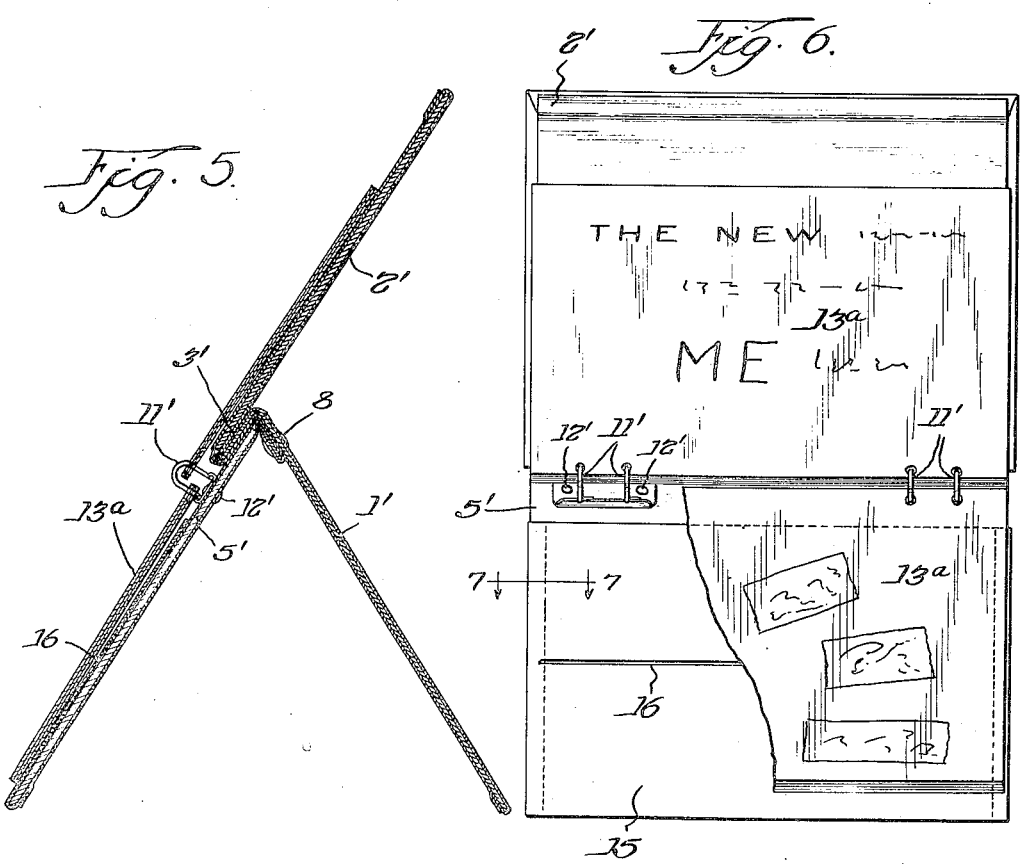

Patented Sept. 19, 1950

2,523,202

UNITED STATES PATENT OFFICE 2,523,202

DISPLAY BINDER

Elmer W. Ericson, Chicago, Ill.

Application November 19, 1947, Serial No. 786,974

14 Claims. (Cl. 281—33)

This invention relates to improvements in display devices, more particularly, to a combined sheet retaining and displaying device.

It is an object of the invention to provide a device of the stated character so constructed that the same may be easily, quickly and effectually converted from its packaging and/or retaining form to one wherein sheets or similar bodies retained therein, each bearing advertising matter as well as many other forms of intelligence or utility, may be moved (selectively, if desired) to display positions.

It is also an object of the invention to provide a combined multi-sheet-like body retaining and displaying service whose form, when in closed or inactive position, will be generally similar to that of a book with covers or panels in opposed or juxtaposed relation, to house, protect and shield therebetween its sheet-like contents, but which, when desired, may be easily and quickly adjusted or moved to an open or active position, at which time, an effectual easel-like support will be had whereby to receive and support the sheet-like bodies in advantageous displaying positions; moreover, to permit their effectual successive display.

Furthermore, it is an object of the invention to provide a combined sheet-like body retaining and displaying device which, when arranged in its displaying or active position, will permit the leaves or sheet-like bodies retained thereby to be displayed in a double-spread manner, i. e., the sheets will be supported in positions one above the other wherein one will be coextensive with and substantially parallel to the other, and so, provide a greater, more attractive and more effectual display of advertising matter or other intelligence carried thereby on their exposed surfaces.

Yet another and equally important object of the invention is to provide a convertible device of the sort referred to, wherein a durable, easy-to-use and economically constructibe dual purpose serving means is incorporated, said means functioning, when the device is in its closed and substantially book-like form, as an effectual book-back, and when it is in its open or easel-like position, to receive thereon and firmly support an upper sheet-like body and/or bodies, substantially co-extensive with and parallel to the other and lower sheet-like bodies, thus effecting an advantageous double-spread display of matter constituted or surface presented thereby.

The foregoing, as well as other objects, advantages and meritorious teachings of my invention, will be in part obvious and in part pointed out in the following detailed disclosure thereof, when taken in conjunction with the accompanying drawings, it being understood that the forms of the invention presented herein are precise and what are now considered to be the better modes of embodying its principles, but that other modifications and changes may be made in specific embodiments without departing from its essential features.

In the drawings:

Figure 1 is a side elevation of the invention in its closed or book-like form, showing sheet-like bodies retained between the cover panels.

Figure 2 is a vertical transverse section through the device when it is in its open and/or easel-like supporting position, showing the displaying positions of its sheet-like bodies.

Figure 3 is a fragmentary and enlarged vertical transverse section through the device, when in its open and easel-like supporting position, illustrating the construction of the cover and supporting panels and their interconnection, plus the manner in which the sheet-like body binding or retaining means are mounted thereon.

Figure 4 is an end view of a somewhat modified form of my improved device, in closed or inactive position.

Figure 5 is a vertical transverse section through the same, showing it in open or easel-like supporting position with the sheet-like bodies retained thereby in displaying positions.

Figure 6 is a front elevation of the device, when in its open or easel-like supporting position, with portions of the lower sheet-like bodies broken away to illustrate the arrangement of the inner side panel pocket, and Figure 7 is an enlarged fragmentary detail in section, taken on the line 7—7 of Figure 6, looking in the direction in which the arrows point, showing the inner side panel pocket formation and one of its collapsible or inwardly foldable side walls.

Referring in detail to the drawings, and particularly, to the form of the invention shown in Figures 1 through 3, the same, generally, consists of a pair of plane and stiff panels or covers of suitable, though preferably complemental shape, designated by the numerals 1 and 2, respectively. The panel 2 is swingably connected to the panel 1 by means of a back panel or flange 3 carried by an appropriate portion of said panel 1, as hereinafter more fully described. It will be thus seen and appreciated that a more or less book-like construction is provided, to wit, the covers 1 and 2 and the back or flange 3.

The panel 1 is constructed from a rectangularly shaped sheet of suitable metal or other material, of gauge or thickness sufficient to render it stiff and substantially form sustaining. One end portion of the panel is inwardly bent transversely of itself, to form the fixed flange or lip 3 which, as will be noted upon reference to Figures 2 and 3 of the drawings, is disposed at an acute angle with relation to its body portion, preferably, though not necessarily, at an angle less than 90°. The free marginal portion of the flange 3 is substantially parallel to the free marginal or end portions of the panels 1 and 2, for a purpose which will hereinafter become apparent.

The panel 2, of shape generally complemental to the panel 1, is made of board (card, composition, etc.) of gauge or thickness sufficient to render the same stiff and form sustaining. It may, however, be made of a material corresponding to that of the panel 1, though desirable production economies are effected by the aforesaid. The length of the panel 2 is somewhat less than that of the panel 1, in order to compensate for the angularity of positioning of the flange 3 and to bring the free marginal portions of said panels into substantially vertical alignment, as shown in Figure 1, when the device is in its closed or book-like form. Also, it will be noted that the normally inner transverse marginal portion or end of said panel 2 is arranged substantially parallel and adjacent to the free marginal portion of the flange 3.

A covering of fabric or like material 4 is fixedly and bodily applied to and over the opposite faces of the panel 1, its angularly disposed flange 3, and the panel 2. Because such covering 4 extends from the flange 3 over and onto the panel 2, a hinged jointure is effected between the two. Thus, due to the fact that the adjacent and parallel marginal portions of said flange 3 and the panel 2 are suitably spaced, the latter will be allowed free swinging (hinged) movement with relation to the former. Consequently, the panel 2 may be swung to its closed position, as shown in Figure 1, or it may, when desired, be swung to its open or co-extensive position, as shown in Figures 2 and 3.

Of course, the side and free or outer marginal portions of the panels 1 and 2, and the flange 3, are also covered by the covering material 4, as is usual in book binding operations.

Arranged adjacent the inner side of the panel 1 and lying between it and the panel 2 is a third and supporting or leg panel 5. Its shape substantially corresponds to the panels 1 and 2, while its length and width are somewhat less than that of the panel 1 and its width is less than that of the panel 2. Thus, the leg panel, when connected, as presently described, will be arranged within the confines of the panels 1 and 2, and so, will be out of the way when the device is in a closed position. Its free and outer end portion is parallel to the corresponding end of the panel 1, in order that firm or even supporting engagement will be effected between the same and a receiving surface, as when the device is arranged in its active or easel-like position, shown in Figure 2.

The normally inner end of the leg panel 5 is hingedly connected to the corresponding end of the panel 1. Such hinged connection is made by extending fabric or other suitable material 6, fixedly applied to and over the opposite sides, free end and side edges of the leg panel 5 from and beyond the normally inner end of the same into fixed engagement with and about an anchoring strip constructed of reasonably heavy and stiff material 7. The strip 7, which is spaced from the free end of the leg panel 5 and parallel thereto, is secured by rivets 8, or other suitable fastening means to and transversely of the inner side of the inner end portions of the panel 1 directly adjacent to and along the point of inward angular bending of its flange 3. Because of the spaced relation between the leg panel 5 and the strip 7, that portion of the fabric 6 spanning the same will provide a more or less strap type of hinged connection between the two. Hence, the leg panel will be rendered freely swingable towards and/or from the panel 1.

Loose-leaf engaging and binding devices 11, of an appropriate type or construction, are fixedly mounted on and transversely of the normally inner side of the inner end portion of the panel 2 by rivets 12 or the like.

Sheet-like bodies, generally designated by the numeral 13, having suitable perforations 13' formed in their corresponding side portions, are engaged by the binding devices 11, which, as shown, pass through said perforations 13'. Thus, the sheet-like bodies will be swingably mounted. The character or form of the bodies 13 may, of course, vary such as conditions or preference may dictate. However, it is preferable that their shapes and sizes shall be such that they will be housed between the cover panels 1 and 2 when the same are arranged in closed or book-like relation (see Figure 1).

Referring to the sheet-like bodies 13, it is to be understood that advertising matter or other intelligence (print and/or illustrations) will be presented on either or both sides thereof. If desired, displays may be surface attached to the bodies 13 of the bodies themselves may be representative, as by cutting, shaping or otherwise forming them. Any number of the sheet-like bodies may be attached to the binding devices 11, though, as will be understood, such bodies will be arranged in the drawing illustrated juxtaposed relation.

When not in use, the device is closed. That is, the panels 1 and 2 are swung into overlying book-like relation, as shown in Figure 1, with the binding devices 11 and the sheet-like bodies 13 housed therebetween and the flange 3 serving as an effectual back.

When used for display, the device is arranged in a substantially upright position with the free ends of the panels 1, 2 and 5, and the sheet-like bodies 13 lowermost. The panel 2 is then swung outwardly and upwardly to a point where its inner end portion is brought to overlie and fully bear on the adjacent side of the fixed angularly disposed flange 3. Thereby, the binding devices 11 will be exposed and positioned, as shown in Figures 2 and 3, with their swingably mounted sheet-like bodies 13 depending therefrom. The panel 1, at this time, will be disposed at an angle oblique to the panel 2.

The leg panel 5 is now swung away from the adjacent side of the panel 1 until one side of its inner end portion is brought into flush abutting and bearing engagement with the adjacent side of the fixed angularly disposed flange 3. When so positioned, the panels 1 and 5 will have assumed a firm or solid substantially inverted V-shaped and easel-like form, as shown in Figure 2. The display device is now in set-up position, ready for displaying usage.

In its set-up position, it is seen that the sheet-like bodies 13 are lying against or bearing on the adjacent side of the obliquely disposed leg panel 5, and that the panel 2 is substantially immovably supported on and by the fixed angular flange 3 of the panel 1, in a position co-extensive with and parallel to the leg panel 5, as hereinbefore described. Consequently, as and when the sheet-like bodies 13 are swung outwardly and upwardly on their binding devices 11, they will come to rest on said co-extensive and parallel panel 2. In such position or positions, the lower and upper sheet-like bodies 13 will be arranged in laterally juxtaposed and more or less contiguous relation, one co-extensive with and substantially parallel to the other, thereby presenting a most advantageous "spread" or "double-spread" of the matter surface presented or constituted thereby.

When satisfactory display and usage of the device has been effected and it is desired to close the same, i. e., return it to its inactive or book-like form, one need only downwardly swing the uppermost of the displayed sheet-like bodies 13 to positions adjacent the corresponding side of the leg panel 5; thereupon, outwardly and downwardly swinging the cover panel 2 to a position adjacent the leg panel 5, after which the cover panel 1 and the leg panel 5 are removed from a supporting surface whereby to allow said cover panel 1 to be swung inwardly to a position adjacent the corresponding side of the leg panel 5. The device will then be in closed or book-like form, as shown in Figure 1 of the drawings, with the leg panel 5 and the sheet-like bodies 13 effectually housed and protected therebetween.

In some forms of construction of my improved device, it may be preferable to change the positioning and fastening of the sheet-like body binding devices. As for example, an arrangement such as shown in Figures 5, 6 and 7 of the drawings, may be effected. In this particular form of the invention, the sheet-like body binding devices 11', instead of being mounted on the normally under side and inner end portion of the cover panel 2', are fixedly mounted, by rivets or other suitable means 12', on an upper end portion of that side of the leg panel 5' normally adjacent the cover panel 2'. In this connection, it will be noted that the sheet-like body binding devices 11' are disposed transversely over said upper portion of the leg panel 5' and, moreover, that they are so arranged as to be adjacent the inner straight edge of the fixed angularly disposed flange 3' of the cover panel 1' when the device is in its set-up or easel-like form, as shown in Figure 6. Such arrangement of the binding devices 11' is, of course, effected so as to provide or ensure full and complete housing of the sheet-like bodies 13a between the cover panels 1' and 2' when the device is in its closed or book-like form, as shown in Figure 5.

If desired, pockets for receiving papers, etc., may be provided to appropriate portions of the panels 1, 1', 2, 2', 5 and 5'. In illustration, I have shown, in the accompanying drawings, the leg panels 5 and 5' as having pockets on certain of their sides. Such pockets are effected by arranging a piece or strip of suitable sheet-like material 14 adjacent one side of the leg panel 5—5'. Said sheet-like material 14 is preferably semi-stiff and of rectangular formation, plus being of a length substantially corresponding to the width of said leg panel 5—5'. A fabric covering and finishing piece 15, of appropriate shape and size, is arranged over the outer side of the material piece 14 and, preferably, is joined thereto by adhesive. The opposite end portions of said fabric are extended over the adjacent ends of the material piece 14, and have their free ends overlappingly engaged and secured, by adhesive or other suitable means, to appropriate portions of the leg panel 5—5'. The extended end portions of the fabric covering 15 are inwardly foldable, in the manner shown in Figure 7 of the drawings, and so, constitute effectual side walls for the material piece 14 formed pocket. If desired, the material piece 14 may be longitudinally slit, as indicated at 16, to provide for a shallower pocket whereby the articles to be engaged or received therein may be conveniently placed and/or removed.

When the improved device is in its set-up and displaying position, as shown in Figures 2 and 5 of the drawings, the leg panels 5 and 5' and the cover panels 2 and 2' are arranged at angles oblique to the perpendicular axis of said device. In consequence, it will be seen and readily appreciated that the sheet-like bodies 13 and 13a will be more effectually supported in their displaying positions with relation to said leg and cover panels. This is particularly true with regard to the uppermost of such sheet-like bodies 13 and 13a, i. e., when the bodies have been swung upwardly and outwardly so as to be brought to rest on the upper and co-extensive cover panels 2 and 2'. The angularity of positioning of the leg panels 5 and 5' and the cover panels 2 and 2' may, if and when desired, be changed, and this can be readily accomplished by merely changing the angularity of positioning of the flange 3 or 3' with relation to its particular cover panel 1 or 1'.

The flange 3—3', being substantially immovable with relation to the panel 1—1', will provide a fixed and firm support and stop for the leg panel 5—5' when the latter is moved into abutting engagement therewith in the manner shown in the Figures 2, 3 and 5 of the accompanying drawings. Thus, the need of tethering or like connection between said panels 1—1' and 5—5', whereby to limit the extent of outward movement therebetween, is entirely eliminated.

Particular attention is directed to the fact that the flange 3—3', and its angular disposition, controls and firmly sets and maintains the angle of inclination of the panel 2—2' and of the leg 5—5' when the same are arranged in their set-up and operative positions, as shown in Figures 2 and 5 of the accompanying drawings; also, that when so arranged, all three members (the flange 3—3', panel 2—2', and leg 5—5') are in parallel relationship. Thereby, a plane and effectual support will be provided to the sheets 13—13', as when they are swung to juxtaposed displaying positions. Moreover, said sheets 13—13' will be arranged in substantially contiguous and parallel relation, and so, materially improve their display function, as for example, when used to effect a double-spread display.

I claim:

1. A device of the character described, including a substantially stiff panel, a stiff flange carried by said panel, a second and substantially stiff panel hinged to said flange swingable in either of two directions with relation thereto and movable, at times, into bearing engagement with and on one side of said flange, and another substantially stiff panel in proximity to the stiff flange swingably connected to said first panel and movable, at times, into bearing engagement with and on the opposite side of said flange and substantially co-extensive with relation to the second panel.

2. A device of the character described, including a substantially stiff panel, a stiff flange carried by said panel and disposed at an angle less than 90° with relation thereto, a second and substantially stiff panel hinged to said flange swingable in either of two directions with relation thereto and movable, at times, into abutting engagement with one side of said flange, and another substantially stiff panel swingably connected to said first panel in proximity to said flange movable, at times, into abutting engagement with the remaining side of said flange and substantially co-extensive with relation to said second panel.

3. A device of the character described, including a substantially stiff panel, a stiff flange carried by said panel, a second and substantially stiff panel hinged to said flange swingable in either of two directions with relation thereto and movable, at times, into abutting engagement with one side of said flange, and another substantially stiff panel swingably mounted on a portion of the first mentioned panel in proximity to the flange, swingable with relation to said flange and movable, at times, into abutting engagement with the remaining side of the same and substantially co-extensive with relation to said second panel.

4. A device of the character described, including a substantially stiff panel, a portion of said panel being bent transversely of itself and forming a stiff flange, a second and substantially stiff panel hinged to the outer end of said flange swingable in either of two directions with relation thereto and movable, at times, into abutting engagement with one side of said flange, and another substantially stiff panel swingably connected to said first panel adjacent said flange and movable, at times, into abutting engagement with the remaining side of said flange and substantially co-extensive with and parallel to said second panel.

5. A device of the character described, including a substantially stiff body, a substantially stiff flange immovably carried by said body in proximity to and substantially transversely of one end portion thereof, a second and substantially stiff body hinged to the free and outer portion of said flange movable, at times, into abutting engagement with one side of said flange, and supporting means swingably connected between portions of said first body and the remaining side of said flange having a portion thereof abuttingly engageable, at times, with the remaining side of said flange.

6. A device of the character described, including a substantially stiff body, a substantially stiff flange immovably carried by said body in proximity to one end thereof, a second and substantially stiff body hinged to a portion of said flange in spaced relation to its point of connection with the first body movable, at times, into abutting engagement with one side of said flange, and supporting means swingably connected to said first body in proximity to said flange having a porttion thereof abuttingly engageable, at times, with the remaining side of said flange and substantially co-extensive with and parallel to said second body.

7. A device of the character described, including a substantially stiff body, a substantially stiff flange immovably carried by said body in proximity and substantially transversely of one end portion thereof, a second and substantially stiff body hinged to the free end portion of said flange movable, at times, into abutting engagement with one side of the flange, and supporting means hingedly connected to a portion of said first body in proximity to said flange movable, at times, into abutting engagement with the remaining side of said flange and substantially co-extensive with relation to said second body.

8. A device of the character described, including a substantially stiff body, a substantially stiff flange immovably carried by said body in proximity and substantially transversely of one end portion thereof and extended from said body at an angle of less than 90°, a second and substantially stiff body hinged to the free end of said flange swingable in either of two directions with relation thereto and movable, at times, into abutting engagement with one side of said flange, a strip secured to one side of said first body substantially parallel and in proximity to the point of jointure of said flange therewith, and supporting means swingably connected to said strip movable, at times, into abutting engagement with a portion of the remaining side of said flange.

9. A display binder, comprising a substantially stiff panel, a stiff flange immovably carried by said panel, a second and substantially stiff panel hinged to said flange swingable in either of two directions with relation thereto and movable, at times, into abutting engagement therewith, another substantially stiff panel swingably connected to said first panel cooperatively adjacent the flange movable, at times, into abutting engagement with said flange and substantially co-extensive with and parallel to said second panel, and sheet binding and retaining means carried by one of said panels adapted to be exposed with abutting engagement of said second panel with said flange.

10. A display binder, comprising a substantially stiff body, a substantially stiff flange immovably carried by said body in proximity and substantially transversely of one marginal end portion thereof, a second and substantially stiff body hinged to the free and outer portion of said flange movable, at times, into abutting engagement with one side of said flange, supporting means swingably connected between portions of said first body and the remaining side of said flange having a portion thereof abuttingly engageable, at times, with said remaining side of the flange, and sheet binding and retaining means mounted on one of said bodies adapted to be exposed with and upon abutting engagement of said second mentioned body with said flange.

11. A display binder, comprising a substantially stiff body, one end portion of said body being bent transversely of itself and forming a stiff flange, a second and substantially stiff body hinged to the free end portion of said flange movable, at times, into abutting engagement with one side of the flange, supporting means swingably connected to said first body in proximity to said flange and movable, at times, into abutting engagement with the remaining side of said flange and substantially co-extensive with and parallel to said second body, and sheet binding and retaining means carried by one of said bodies adapted to be exposed with abutting engagement of said second mentioned body with said flange.

12. A device of the character described, including a substantially stiff panel, a stiff flange carried by said panel, a second and substantially stiff panel hinged to said flange swingable in either of two directions with relation thereto and movable, at times, into abutting engagement therewith, and another substantially stiff panel swingably connected to said first panel in proximity to said flange swingable at times, away from the first panel into a position substantially co-extensive with relation to the second panel and abutting said flange.

13. A device of the character described, including a substantially stiff panel, a stiff flange carried by said panel and disposed at an angle of less than 90° with relation thereto, a second and substantially stiff panel hinged to said flange swingable in either of two directions with relation thereto and movable at times, into abutting engagement therewith, and a substantially stiff panel swingably connected to said first panel in proximity to said flange and swingable, at times, into a position substantially coextensive with relation to the second panel, and abutting said flange.

14. A device of the character described, including a substantially stiff panel, a stiff flange fixedly carried by said panel, a second and substantially stiff panel hinged to said flange swingable in either of two directions with relation thereto and movable, at times, into abutting engagement therewith, and another substantially stiff panel swingably mounted on the first panel swingable with relation to said flange, at times, into abutting engagement therewith, and in substantial parallelism thereto and to said second panel.

ELMER W. ERICSON.

REFERENCES CITED

The following references are of record in the file of this patent:

UNITED STATES PATENTS

| Number | Name | Date |
|---|---|---|
| 2,205,692 | Johnson et al. | June 25, 1940 |